H. W. VAN MEETEREN.
METHOD OF AND MEANS FOR ASSEMBLING A PNEUMATIC OR ELASTIC TIRE IN RELATION TO A RIM OR WHEEL.
APPLICATION FILED JUNE 13, 1917.
1,432,311.
Patented Oct. 17, 1922.
2 SHEETS—SHEET 1.
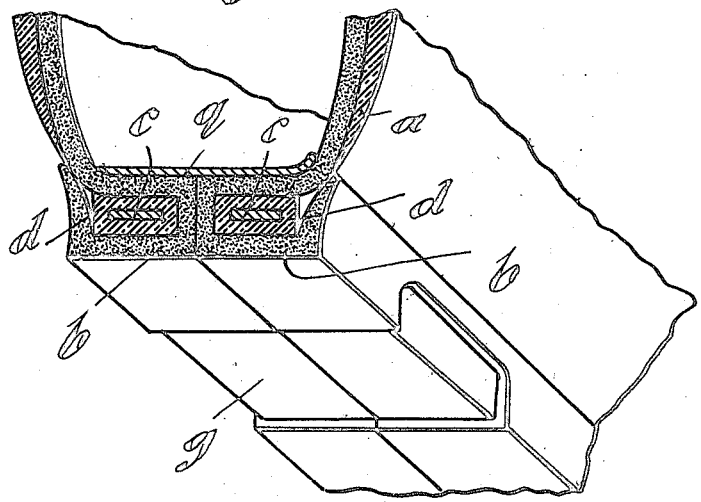
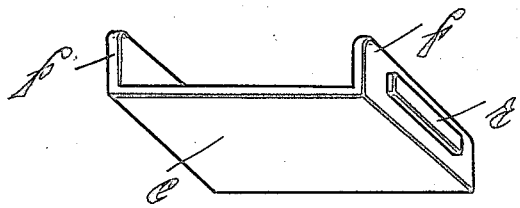
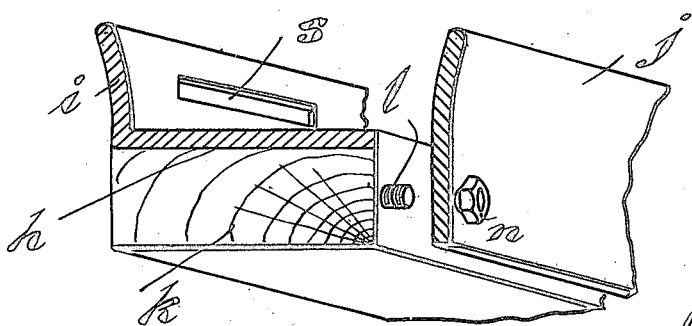

H. W. VAN MEETEREN.
METHOD OF AND MEANS FOR ASSEMBLING A PNEUMATIC OR ELASTIC TIRE IN RELATION TO A RIM OR WHEEL.
APPLICATION FILED JUNE 13, 1917.
1,432,311.
Patented Oct. 17, 1922.
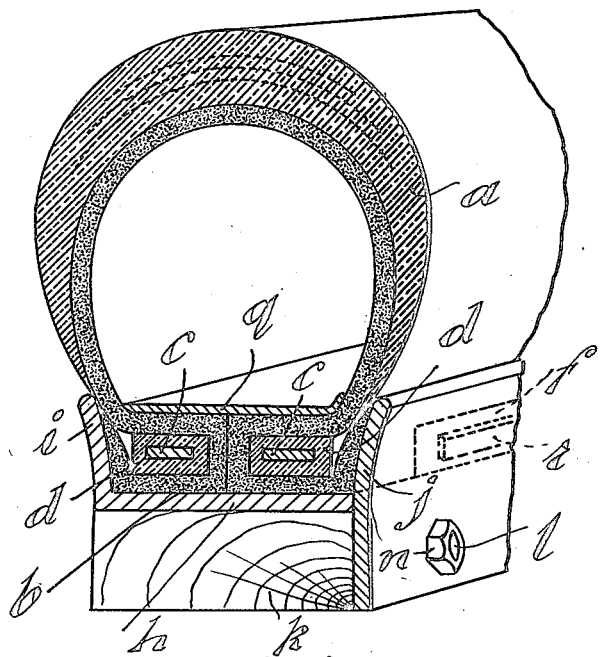
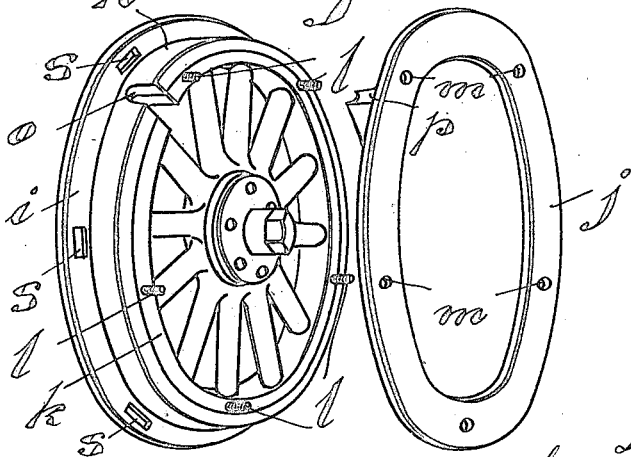

Patented Oct. 17, 1922.

1,432,311

UNITED STATES PATENT OFFICE.

HARRY WILLIAM van MEETEREN, OF BIRMINGHAM, ENGLAND, ASSIGNOR OF ONE-THIRD TO AMOS EDWARDS, AND ONE-THIRD TO HENRY HEADLEY, BOTH OF BIRMINGHAM, ENGLAND.

METHOD OF AND MEANS FOR ASSEMBLING A PNEUMATIC OR ELASTIC TIRE IN RELATION TO A RIM OR WHEEL.

Application filed June 13, 1917. Serial No. 174,644.

*To all whom it may concern:*

Be it known that I, HARRY WILLIAM VAN MEETEREN, a subject of the Queen of the Netherlands, residing at Edgbaston, Birmingham, England, have invented certain new and useful Improvements in Methods of and Means for Assembling a Pneumatic or Elastic Tire in Relation to a Rim or Wheel, of which the following is a full, clear, and exact specification.

This invention comprises a pneumatic or elastic tire cover which is furnished with solid block-like base portions extending in uninterrupted continuity around the entire circumference of the tire, within the interior of which block-like base portions circumferential metallic reinforcing members are embedded, having connecting means incorporated and adapted to couple the base portions together prior to the assemblage of the cover between the separable parts of a divisible carrier rim, and in which the members for coupling the base portions of the tire together are adapted to so co-operate with the divisible carrier rim that they are locked from circumferential movement in relation thereto.

In one method of carrying out the present invention, the base portions of the tire are adapted to be coupled together by a series of short channel members or sections, and there are provided upon the outer surfaces of the side webs or members of the channel-shaped coupling device, projections adapted to engage within recesses provided in the separable parts of the carrier rim. These projections may be elongated circumferentially of the wheel, and may be disposed midway between top and bottom of the side web of the coupling member, and the recesses in the side flanges of the carrier rim adapted to accommodate these projections may be of substantially the same size as, or suitably larger than, the projections.

Alternately or additionally, one or more transverse or other projections may be provided upon that face of the transverse part of the U-shaped coupling member which is adjacent to the cylindrical part of the carrier rim, such projection or projections being adapted to engage within a corresponding recess or recesses in this part of the carrier rim so that the coupling members are thereby effectively locked from circumferential movement, and such coupling members thus retain the tire from creeping by reason of the connection which they have with the tire by virtue of the recesses in the latter in which the coupling members are disposed.

In order that this invention may be clearly understood and readily carried into practice, reference may be had to the appended explanatory two sheets of drawings, upon which:—

Figure 1 illustrates separately the various parts of a tire and rim according to the present invention.

Figure 2 illustrates the parts shown in Figure 1 in their assembled condition.

Figure 3 illustrates the separate parts of the wheel, a section of which is shown in Figures 1 and 2.

In the drawings, $a$ is the tire cover, having rectangular base portions $b$, $b$, in each of which an endless steel band or ribbon $c$ is incorporated. Each element $c$ is encircled with a rubber covering $d$, which latter is in turn encircled by the canvas portion of the tire. $e$ are the channel members, the flanges or side webs $f$ of which are adapted to externally embrace the base portions of the tire. These channel members $e$ are assembled in relation to appropriately recessed parts $g$ of the base portions of the tire so that they remain in frictional engagement therewith and do not produce any surface projections.

The channel members $e$ are locked from circumferential movement in relation to the carrier rim. According to one method of providing for this there are provided upon the outer surfaces or side webs or members of each channel-shaped coupling device $e$, projections adapted to engage within recesses $s$ provided in the separable parts of the carrier rim. Such recesses may be of substantially the same size as, or substantially larger than, the projections. Alternatively or additionally, one or more transverse or other projections may be provided upon that face of the transverse part of the U-shaped coupling member which is adjacent to the cylindrical part of the carrier rim, such projection or projections being adapted to engage within a corresponding recess or recesses in this part of the carrier rim.

The coupling members $b$, $e$ being thereby locked from circumferential movement in relation to the carrier rim thereby retain the tires from creeping by reason of the connection which they have with the tire by virtue of the recesses in the latter in which the coupling members are disposed.

$a$ is an annular flap of canvas or other suitable material secured to one of the base portions $b$ and adapted to cover the division occurring between said base portions.

The tire cover is adapted to be assembled in any suitable manner within a composite rim. This rim may comprise a cylindrical steel band $h$ forming the base of the rim and having an integral web or flange $i$ on one side, a separable or detachable web or flange in the nature of a plate or ring $j$ being adapted to be secured in relation to the other side of the cylindrical portion of the steel rim. The cylindrical portion of the rim may be mounted upon a suitable wooden or other felly $k$, on to which felly the separable portion $j$ of the rim may be secured. In one method of attaching the portion $j$, projecting screwed stems $l$ fixed within the felly $k$ are adapted to pass through perforations $m$ in the separable flange, which latter is secured by nuts $n$ assembled outside of the flange upon the screwed stems.

In the cylindrical portion of the rim member at one point in its circumference, a lateral groove or slot $o$ is furnished, which groove or slot may also be provided in the wooden carrier felly $k$, where such is present, such slot being adapted to accommodate the valve. A lug $p$ may be provided on the separable ring portion of the rim and adapted to occupy that part of the slot unoccupied by the valve.

What I claim as my invention and desire to secure by Letters Patent is:—

In a pneumatic or elastic tire cover having solid block-like base portions extending in uninterrupted continuity around the entire circumference of the tire cover in combination with the recessed carrier rim of said tire, circumferential metallic reinforcing members embedded in said portions, connecting means incorporated in said members and adapted to couple the base portions together prior to the assemblage of the cover in its rim, projections on said coupling or connecting member adapted to project into the recesses of said curved rim for positively preventing a creeping of the tire with its connecting members in relation to the carrier rim and locking the tire against circumferential movement in relation to the rim, substantially as described.

In witness whereof I have hereunto set my hand in the presence of two witnesses.

HARRY WILLIAM van MEETEREN.

Witnesses:
ARTHUR H. BROWN,
E. WHEELER.